(12) United States Patent
Fuchs et al.

(10) Patent No.: US 10,975,667 B2
(45) Date of Patent: Apr. 13, 2021

(54) SYSTEM AND METHOD FOR MONITORING DISPOSAL OF WASTEWATER IN ONE OR MORE DISPOSAL WELLS

(71) Applicant: SOURCEWATER, INC., Houston, TX (US)

(72) Inventors: Jason Fuchs, Louisville, KY (US); Forrest Webb, Evanston, IL (US); Deirdre Alphenaar, Prospect, KY (US)

(73) Assignee: SOURCEWATER, INC., Houston, TX (US)

( * ) Notice: Subject to any disclaimer, the term of this patent is extended or adjusted under 35 U.S.C. 154(b) by 0 days.

(21) Appl. No.: 16/583,737

(22) Filed: Sep. 26, 2019

(65) Prior Publication Data

US 2020/0017372 A1    Jan. 16, 2020

Related U.S. Application Data

(63) Continuation of application No. PCT/US2018/023516, filed on Mar. 16, 2018.

(60) Provisional application No. 62/477,088, filed on Mar. 27, 2017.

(51) Int. Cl.
| | | |
|---|---|---|
| *E21B 41/00* | (2006.01) | |
| *G06K 9/00* | (2006.01) | |
| *E21B 47/10* | (2012.01) | |
| *C02F 1/00* | (2006.01) | |
| *E21B 47/003* | (2012.01) | |

(52) U.S. Cl.
CPC .......... *E21B 41/0057* (2013.01); *C02F 1/006* (2013.01); *C02F 1/008* (2013.01); *E21B 47/003* (2020.05); *E21B 47/10* (2013.01); *G06K 9/00711* (2013.01); *G06K 9/00771* (2013.01); *C02F 2209/008* (2013.01); *C02F 2209/05* (2013.01); *C02F 2209/06* (2013.01); *C02F 2209/10* (2013.01); *C02F 2209/40* (2013.01); *G06K 2009/00738* (2013.01)

(58) Field of Classification Search
CPC ...... C02F 1/008; C02F 1/006; E21B 41/0057; E21B 47/10
See application file for complete search history.

(56) References Cited

U.S. PATENT DOCUMENTS

| | | | |
|---|---|---|---|
| 7,233,252 B1* | 6/2007 | Hardin | G01F 1/002 340/603 |
| 2013/0146535 A1* | 6/2013 | Albert | C02F 1/008 210/614 |
| 2016/0019482 A1* | 1/2016 | Venhoff | G06Q 10/0639 705/7.38 |
| 2016/0063402 A1* | 3/2016 | Webb | G06Q 10/067 705/348 |

* cited by examiner

*Primary Examiner* — Bryan Bui
(74) *Attorney, Agent, or Firm* — Medler Ferro Woodhouse & Mills PLLC (57) ABSTRACT

A system and method for monitoring disposal of wastewater in a disposal well includes: an event monitor sensor configured to identify a wastewater disposal event; and a second sensor configured to collect data about one or more characteristics of the wastewater during the wastewater disposal event. The data from the second sensor at the disposal well is analyzed to determine a classification of the wastewater, which is then reported to an operator or another interested party.

20 Claims, 3 Drawing Sheets

SYSTEM AND METHOD FOR MONITORING DISPOSAL OF WASTEWATER IN ONE OR MORE DISPOSAL WELLS

CROSS-REFERENCE TO RELATED APPLICATIONS

This application is a continuation of International Application No. PCT/US2018/023516, filed Mar. 21, 2018, which claims the benefit of U.S. Provisional Application No. 62/477,088, filed Mar. 27, 2017, the entire contents of both of which are hereby incorporated by reference in their entirety.

BACKGROUND OF THE INVENTION

In oil-producing and gas-producing regions, hydrocarbon exploration and production companies require water when drilling wells using hydraulic fracturing. Furthermore, producers need a location to dispose of both the used fracturing fluid (flow-back water) and the water that is produced naturally alongside the hydrocarbons (produced water).

In many cases, depending on state, regional, or federal regulations, the flow-back and produced water is deposited into a dedicated disposal well. Such a disposal well may also be referred to as a saltwater disposal well (SWD) or a wastewater disposal well. Disposal wells are often operated in remote areas, often unmanned by any staff or management to oversee disposal events. Subsequently, operators often lack insight into key details of the daily operations of a disposal well. These details include, among others, site security, recordkeeping, billing, and scheduling of preventative maintenance.

In many instances, wastewater disposal events are self-reported by the driver of a disposal truck. The operator has little recourse to verify that information regarding a disposed quantity of water, such as the type and volume of water, is accurate or even correct. An operator may charge vastly different rates for disposal of different fluid types and is incentivized to ensure there is as little error as possible. Furthermore, paper records are often the only records of disposal events, which may be difficult to audit to verify that events were reported accurately.

Additionally, operators may be actively engaged in buying or selling services in a water disposal marketplace where operational data is valuable. For instance, an operator may advertise its current prices for its disposal services in an effort to attract truck drivers who are hauling waste to use those services. Factors that influence the price might include, but are not limited to, disposal capacity, traffic volumes, well pressures, tank levels, or volumes of different types of wastewater over time. If the operator can automatically measure and communicate these types of data to the wider market, it can realize certain operational efficiencies.

SUMMARY OF THE INVENTION

The present invention is a system and method for monitoring disposal of wastewater in one or more disposal wells.

In the system and method of the present invention, disposal wells are outfitted with sensors to determine information related to wastewater that is disposed in the well, and that information is then delivered to the operator of the disposal well. Specifically, in the system and method of the present invention, disposal of wastewater in disposal wells is monitored by analyzing wastewater that is disposed in a monitored well. Furthermore, a rules-based classification system is employed to automate detection and classification of future disposal events. Furthermore, the system and method of the present invention allows the wastewater disposal information to be leveraged to predict and characterize energy commodity extraction in a region.

In an exemplary system made in accordance with the present invention, a well facility, which may include one or more disposal wells, includes an event monitor sensor associated with each of the one or more wells. The event monitor sensor comprises one or more sensors to identify the presence of a volume of wastewater to be disposed and/or of a wastewater disposal event. In some embodiments, the event monitor sensor is a camera or similar imaging device that collects images to determine the start and/or completion of a wastewater disposal event. In some embodiments, rather than use a camera or similar imaging device, the event monitor sensor is a laser beam and photo-eye combination that is tripped or broken when a truck passes through the path of the beam, thus identifying the start and/or completion of a wastewater disposal event.

In some embodiments, the event monitor sensor is a coil of wire embedded in the road, a pneumatic tube, or a vibration sensor that can detect when a truck passes over it, each of which can identify the start and/or completion of a wastewater disposal event. Finally, in some embodiments, a pump associated with a well is monitored by the event monitor sensor; for example, the event monitor sensor may be a current sensor that is used to monitor the power consumption of one or more pumps that are associated with the well.

Irrespective of the type of sensor employed, the event monitor sensor collects data, and the collected data is then transmitted to the central processing facility, where the collected data is stored in a database for subsequent use or analysis.

In an exemplary system made in accordance with the present invention, the well facility further includes a second sensor (or sensors) associated with the well. The second sensor measures one or more characteristics of the wastewater that is being disposed in the well. For example, the second sensor may be one or more of: a total suspended solids (TSS) sensor; a pH sensor; and a conductivity sensor. Irrespective of the type of sensor employed, the collected data is then also transmitted to the central processing facility and stored in a database.

The collected data is then analyzed using a water analysis module, which makes use of a digital computer program, i.e., computer-readable instructions stored and executed by a computer, to carry out the analysis. In one exemplary implementation, the analysis carried out by the water analysis module commences with the collection and cleaning of the data, which may be accomplished, for example, by applying transforms to create uniform date/time formats and/or removing duplicate rows. Statistics are then computed for the disposed wastewater during the wastewater disposal event. Finally, the collected (and cleaned) data is then analyzed to determine a classification for the wastewater, for example, by applying a water classification model.

The water classification model is a function that maps an input variable (i.e., collected data from the second sensor) to one or more discrete classes (i.e., water classifications). In this particular case, the objective is to distinguish between four different classes of wastewater: (i) produced water; (ii) flow-back water; (iii) pit water; and (iv) basic sediment and waste (BSW). Common models that may be used, for example, are decision trees, nearest neighbor classifiers, logistic regression models, and support vector machines. In each case, the water classification model is built and established by using a training set of water information from an external source (or "truth data") and then correlating that water information to collected (and cleaned) data from the second sensor. No matter which type of model is used, the objective is to create a model that accurately predicts the values of the unknown or future values. For example, since collected data from the second sensor may be from total suspended solids (TSS) sensor, a pH sensor, conductivity sensor (or other sensor), data about total suspended solids, pH, and/or conductivity may all be inputs into a water classification model that delivers as its output a classification of wastewater: (i) produced water; (ii) flow-back water; (iii) pit water; or (iv) basic sediment and waste (BSW). Once built and established, the water classification model is applied to subsequently collected (and cleaned) data to determine a classification for the wastewater during a particular wastewater disposal event.

Finally, the classification, along with statistics for the disposed wastewater during the wastewater disposal event, is communicated to an operator or other interested parties. It is contemplated and preferred that such communication to the operator or other interested parties could be achieved through electronic mail delivery and/or through export of the data to an access-controlled Internet web site, which the operator or other interested parties can access through a common Internet browser program.

In addition to being utilized by an operator of a well facility, the system and method of the present invention may be further leveraged to predict and analyze energy commodity and/or water consumption in a region.

DETAILED DESCRIPTION OF THE INVENTION

The present invention is a system and method for monitoring disposal of wastewater in one or more disposal wells.

In the system and method of the present invention, disposal wells are outfitted with sensors to determine information related to wastewater that is disposed in the well, and that information is then delivered to the operator of the disposal well. Specifically, in the system and method of the present invention, disposal of wastewater in disposal wells is monitored by analyzing wastewater that is disposed in a monitored well. Furthermore, a rules-based classification system is employed to automate detection and classification of future disposal events. Furthermore, the system and method of the present invention allows the wastewater disposal information to be leveraged to predict and characterize energy commodity extraction in a region.

Figure 1:
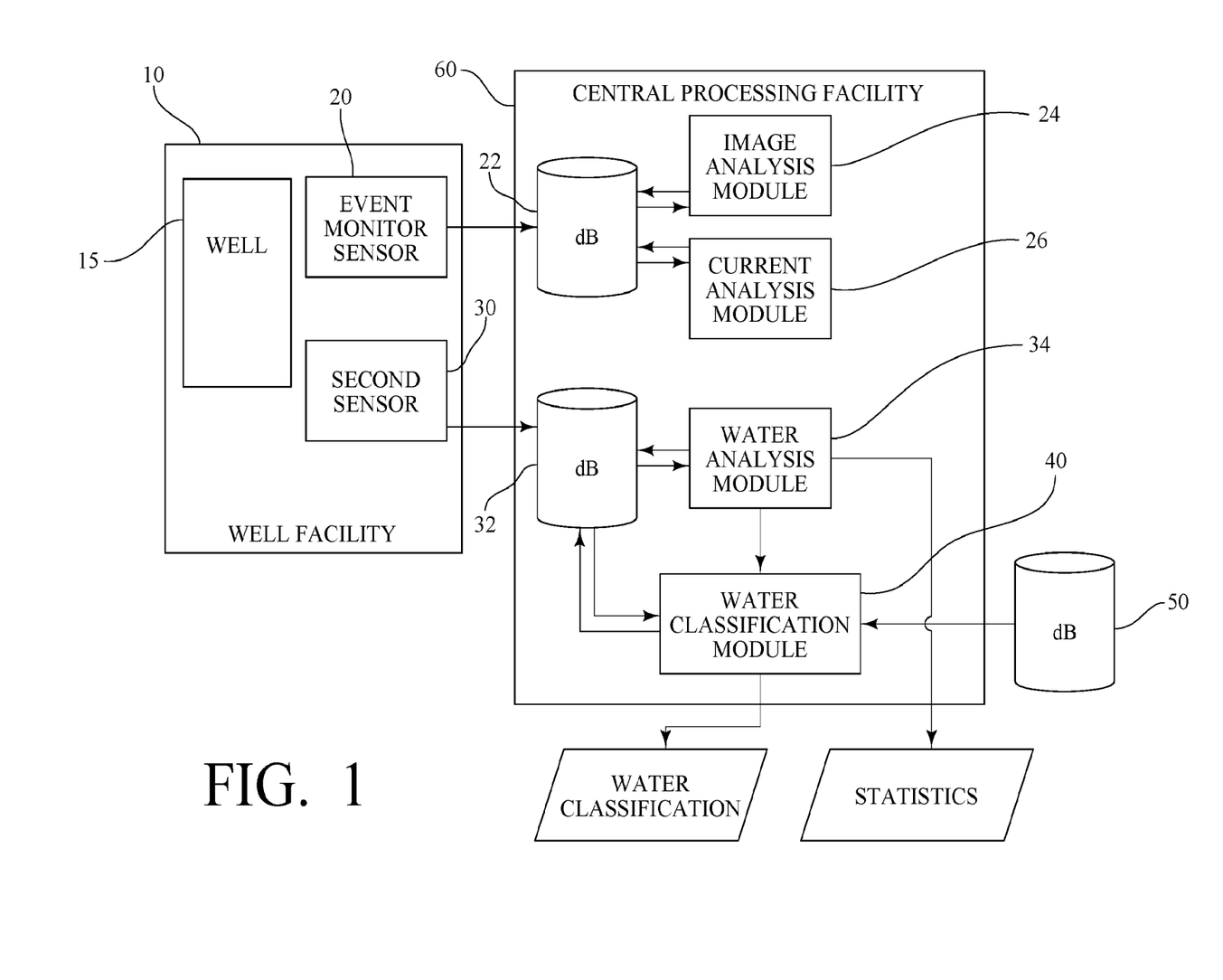
FIG. 1 is a schematic representation of an exemplary system made in accordance with the present invention.

FIG. 1 is a schematic representation of an exemplary system made in accordance with the present invention. A well facility 10 is illustrated as including a single well 15 for simplicity, but a well facility 10 may include multiple wells 15 within the facility. The well facility 10 further includes an event monitor sensor 20 associated with the well 15. The event monitor sensor 20 comprises one or more sensors to identify the presence of a volume of wastewater to be disposed and/or of a wastewater disposal event.

In some embodiments, the event monitor sensor 20 is a camera or similar imaging device that collects images to determine the start and/or completion of a wastewater disposal event. For example, the wastewater disposal event may be defined as a disposal truck entering and subsequently exiting the well facility 10. Truck arrival and departure times may be determined by analyzing images of the well facility 10 that are captured by the camera or similar imaging device, which, of course, would be mounted or otherwise positioned so that it has a sufficient view of the well facility 10, particularly the bays in which trucks unload wastewater. For example, one camera that may be used for such image capture is the Axis Q1775 Network Camera manufactured by Axis Communications AB of Lund, Sweden.

The event monitor sensor 20 may collect images at a set time interval, for instance, once every three minutes. Furthermore, as shown in FIG. 1, the collected images are then preferably transmitted to a central processing facility 60, where the collected images are stored in a database 22 for subsequent use or analysis.

Event information can then be extracted from the collected images using one of several techniques. For example, in some embodiments, a human could curate collected images to identify the arrival and departure times of trucks. Alternatively, the collected images could be analyzed via crowdsourcing (using platforms such as Amazon Mechanical Turk or CrowdFlower) to allow for faster human processing of the images.

In other embodiments, the collected images are analyzed utilizing an image analysis module 24 at the central processing facility 60, which makes use of a digital computer program, i.e., computer-readable instructions stored and executed by a computer, to carry out the analysis. For example, the collected images may be organized in chronological order, and the image analysis module 24 could then be used to detect changes in the images, such as the arrival and/or departure of a truck. The image analysis module 24 may then also detect the start and/or completion of a wastewater disposal event by identifying the first image (and time of the image) that a truck is visible in an image, and subsequently identify the last image (and time of the image) that the same truck is visible. From such an image analysis, a wastewater disposal event is identified.

As a further refinement, in some embodiments, collected images may be further utilized to identify and track additional information related to the customers of the well facility 10. For instance, particular trucks, truck drivers, and trucking companies may be identified based on analysis of the collected images from the event monitor sensor 20 or other imaging device. For example, in some embodiments, identifying marks from each truck may be captured. This can be done by employing optical character recognition (OCR) technology to read, for example, the license plate, the waste hauling permit (WHP) number, the company name, or other text from the truck itself. One exemplary imaging system is the AutoVu™ automatic license plate recognition (ALPR) system manufactured by Genetec, Inc. of Montreal, Quebec, Canada. In other embodiments, visual information may be collected by cameras positioned outside of the operator's property to capture details on vehicle identifying marks or vehicular traffic in general. These cameras are positioned so that the relevant information is captured. They may be installed, for instance, above or near the roadway outside the facility. Additionally, the cameras may be positioned remotely, for instance, mounted to an aerial vehicle or satellite. In any event, by independently identifying and matching a wastewater disposal event to a certain truck, truck driver, or trucking company, record-keeping and billing may be further automated to ensure the operator of the well facility 10 is properly compensated for all wastewater disposal events.

In some embodiments, rather than use a camera or similar imaging device, the event monitor sensor 20 is a laser beam and photo-eye combination that is tripped or broken when a truck passes through the path of the beam, thus identifying the start and/or completion of a wastewater disposal event.

In some embodiments, the event monitor sensor 20 is a coil of wire embedded in the road, a pneumatic tube, or a vibration sensor that can detect when a truck passes over it, each of which can identify the start and/or completion of a wastewater disposal event.

In some embodiments, a pump associated with a well 15 is monitored by the event monitor sensor 20. For example, the event monitor sensor 20 may be a current sensor that is used to monitor the power consumption of one or more pumps that are associated with the well 15. Specifically, the event monitor sensor 20 (or current sensor) may be used to determine when a pump turns on or off, or how long a pump associated with the well 15 is in operation. Such monitoring of current flowing to a pump is described in U.S. Patent Publication No. 2016/0019482, which is entitled "Method and System for Monitoring a Production Facility for a Renewable Fuel" and is incorporated herein by reference. As described therein, current sensors are placed on power cables associated with one or more pumps; such placement is preferably non-invasive (e.g., around the power cables) and does not interrupt operation. For example, one preferred sensor for use in the system and method of the present invention is a PAN-series current sensor manufactured by Panoramic Power Ltd of Kfar Saba, Israel, one of which would be placed on a power cable for each of the pumps of the well 15.

In some embodiments, such a current sensor may be remotely positioned, for instance, near electric power transmission lines that are connected to and supplying power to the facility. In this instance, the current sensors do not come in contact with the wires through which they are measuring the current. Instead, the sensors are arranged to remotely measure the magnetic and electric fields produced by the conductors of the electric power transmission lines and calculate the power moving through the conductors, as described, for example, in U.S. Pat. No. 6,771,058 entitled "Apparatus and Method for the Measurement and Monitoring of Electrical Power Generation and Transmission" and U.S. Pat. No. 6,714,000 entitled "Apparatus and Method for Monitoring Power and Current Flow," each of which is incorporated herein by reference.

Again, the event monitor sensor 20 may collect data at a set time interval, for instance, once every three minutes, and the collected data is then preferably transmitted to the central processing facility 60, where the collected data is stored in a database 22 for subsequent use or analysis.

With respect to collected current data, to convert such current data to operational status information, the current data is analyzed using a current analysis module 26, which makes use of a digital computer program, i.e., computer-readable instructions stored and executed by a computer, to carry out the analysis. In the current analysis module 26, the analog data is digitized based on a given threshold. If the measured current is above the threshold, the pump is considered to be "ON," whereas, if the measured current is below the threshold, the pump is considered to be "OFF."

The time at which the pump transitions from one state to another can then be extracted from the data. From this data stream, information about when the pump turned on, when it turned off, and how long it was in operation for a given period can be generated.

In order to determine how much fluid has flown through the pump during operation (i.e., during a wastewater disposal event), it is necessary to create a model relating pump current to the fluid flow rate, for a given set of fluid properties. Then, this current-to-flow-rate mapping can be applied to future events. Such creation of transforms which takes collected data and transforms the collected data into operational statuses is also described in U.S. Patent Publication No. 2016/0019482, which is entitled "Method and System for Monitoring a Production Facility for a Renewable Fuel" and is incorporated herein by reference.

Additionally, pumping events may be determined by making use of operator-supplied data streams, such as those created by a supervisory control and data acquisition (SCADA) system. As part of this SCADA system, a tablet, laptop, personal computer, or other input device may be used by the truck drivers or pump operators to input characteristics about a load of wastewater. For instance, the operator may input the arrival time, departure time, volume of wastewater disposed of, wastewater classification, license plate number, waste hauler permit number, or department of transportation permit number of a truck. This input method is tied to the operator's backend financial accounting system, where the data can be stored in a database and retrieved as needed.

Referring again to FIG. 1, the well facility 10 further includes a second sensor 30 (or sensors) associated with the well 15. The second sensor 30 measures one or more characteristics of the wastewater that is being disposed in the well 15. For example, in some embodiments, the second sensor 30 is a total suspended solids (TSS) sensor, such as the Model 950 Suspended Solids Monitor manufactured by Confab Instrumentation of Jackson, Calif. As wastewater is disposed in the well 15, the TSS sensor monitors total suspended solids in the wastewater. For another example, in other embodiments, the second sensor 30 is a pH sensor, such as the Model DPD1P1 Online Process pH Sensor manufactured by Hach Lange GmbH of Dusseldorf, Germany. For yet another example, in other embodiments, the second sensor 30 is a conductivity sensor, such as the 3700 Series Analog Inductive Conductivity Sensor manufactured by Hach Lange GmbH of Dusseldorf, Germany.

Referring again to FIG. 1, irrespective of the type of sensor employed, the collected data is then preferably transmitted to the central processing facility 60 and stored in a database 32. The collected data is then analyzed using a water analysis module 34, which makes use of a digital computer program, i.e., computer-readable instructions stored and executed by a computer, to carry out the analysis. For example, a remote backhaul device, such as the Wavelet device manufactured by Ayyeka Technologies of Jerusalem, Israel, may be utilized to sample and collect data from the second sensor 30 and then communicate the collected data to the water analysis module 34 at the central processing facility 60 for analysis.

Figure 2:
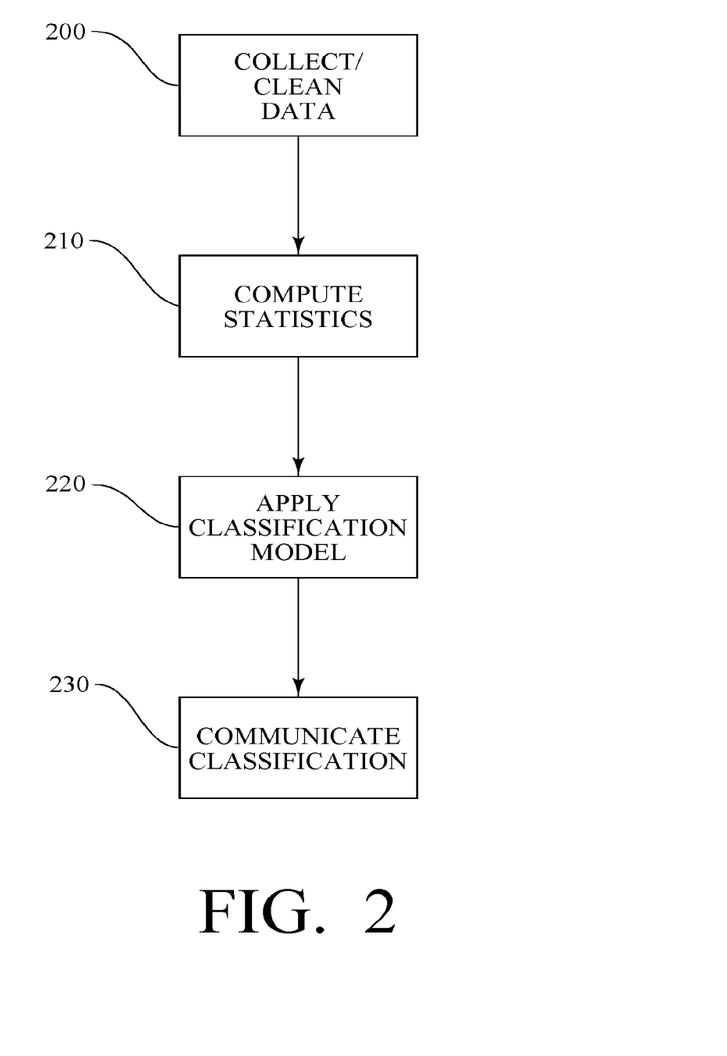
FIG. 2 is a flow chart illustrating the steps of an analysis carried out by the water analysis module in an exemplary implementation of the present invention.

In this exemplary implementation, and referring now to FIG. 2, the analysis carried out by the water analysis module 34 commences with the collection and cleaning of the data, as indicated by block 200. In this regard, data may be collected from the second sensor 30 (or sensors) at the well 15 on a substantially continuous basis, for example, at some fixed frequency, such as every one minute. Alternatively, data collection may be initiated when there is an indication of an occurrence of a wastewater disposal event. The indication of the occurrence of the wastewater disposal event may be based on the data from the event monitor sensor 20. For example, as described above, the event monitor sensor 20 may identify that a wastewater disposal event has begun by image analysis and/or pump current monitoring, at which time the second sensor 30 starts collecting data. Similarly, the event monitor sensor 20 may provide a signal to indicate that a wastewater disposal event has concluded, at which time the second sensor 30 stops collecting data.

Referring still to FIG. 2, with respect to the cleaning of the data, this may be accomplished by, for example, applying transforms to create uniform date/time formats and/or removing duplicate rows.

Referring still to FIG. 2, statistics are then computed for the disposed wastewater during the wastewater disposal event, as indicated by block 210. For example, a wastewater disposal event may be defined as one truck entering the well facility 10, unloading its wastewater, and then exiting the well facility 10. Relevant data would be collected from the second sensor 30 (or sensors) only when the pump utilized by that truck to unload its wastewater is running. In other words, with respect to the exemplary sensor types disclosed above, the total suspended solids, pH, and/or conductivity measurements are all irrelevant when there is no wastewater being disposed. Thus, the analysis focuses on the time period of the wastewater disposal event. For example, as discussed above, the time at which a pump turned on (pump start time) and the time at which a pump turned off (pump stop time) can both be determined by the event monitor sensor 20. Therefore, the water analysis module 34 only needs to analyze data from the second sensor 30 (or sensors) during the wastewater disposal event. Statistics such as mean, standard deviation, maximum, and minimum can then be found easily for each of the water quality metrics within the time window defined by the wastewater disposal event.

Referring still to FIG. 2, the collected (and cleaned) data is then analyzed to determine a classification for the wastewater. Such classification may be determined, for example, by applying a water classification model, as indicated by block 220 in FIG. 2.

Referring again to FIG. 1, to establish a water classification model, a water classification module 40 receives water information from an external source 50. This water information is "truth data" that is accurate information about the wastewater that was pumped into the well 15 during a given wastewater disposal event; for example, for initial training establishment of the water classification model, such water information may come from or be derived from operator records. In some implementations, water information is split into a training set and a test set. For instance, in some implementations, approximately 80% of the water information data is classified as the training set, while 20% of the water information is classified as the test set, although this can vary on a case-by-case basis. This allows for the water classification model to be built using the training set, and then subsequently applied to the test set to assess its accuracy, as further described below.

In its simplest form, the water classification model is a function that maps an input variable (i.e., collected data from the second sensor 30) to one or more discrete classes (i.e., water classifications). In this particular case, the objective is to distinguish between four different classes of wastewater: (i) produced water; (ii) flow-back water; (iii) pit water; and (iv) basic sediment and waste (BSW). Common models that may be used, for example, are decision trees, nearest neighbor classifiers, logistic regression models, and support vector machines. In each case, the water classification model is built and established by using the training set of water information from an external source 50 (or "truth data") and then correlating that water information to collected (and cleaned) data from the second sensor 30. No matter which type of model is used, the objective is to create a model that accurately predicts the values of the unknown or future values. For example, since collected data from the second sensor 30 may be from a total suspended solids (TSS) sensor, a pH sensor, conductivity sensor (or other sensor), data about total suspended solids, pH, and/or conductivity may all be inputs into a water classification model that delivers as its output a classification of wastewater: (i) produced water; (ii) flow-back water; (iii) pit water; or (iv) basic sediment and waste (BSW).

For example, one specific method for classifying wastewater is based on the use of a logistic regression model. A logistic regression is a type of model that tries to predict the value of a discrete binary variable, Y, given one or more independent variables, X. It can answer questions such as: "Did a student pass or fail this test?" or "Was this subject healthy or sick?" Moreover, a logistic regression model can provide a probability that a certain example fits into one class or the other. For instance, the logistic regression model allows for statements such as "there is a 51% chance that it will rain today," or "there is a 99% chance that it will snow tomorrow," rather than simply stating that "it will rain" or "it will snow."

We can describe this model in a more formal way. The outcome, or dependent variable, is y. We know y can take only one of two values. In the case of the student passing a test, the value is either "pass" or "fail." So, we can denote y taking on only these two values by:

$$y \in \{0,1\} \tag{1}$$

Now, we want some function that can maximize the likelihood or probability of y=1 when y really is 1, and y=0 when the opposite is true. One function that achieves this is the logistic function:

$$h_\theta(x) = g(\theta^T x) = \frac{1}{1 + e^{-\theta^T x}} \tag{2}$$

where θ represents a vector of weight parameters that are applied to x. More simply, with $z=\theta^T x$, the equation can be rewritten as:

$$g(z) = \frac{1}{1 + e^{-z}} \tag{3}$$

Figure 3:
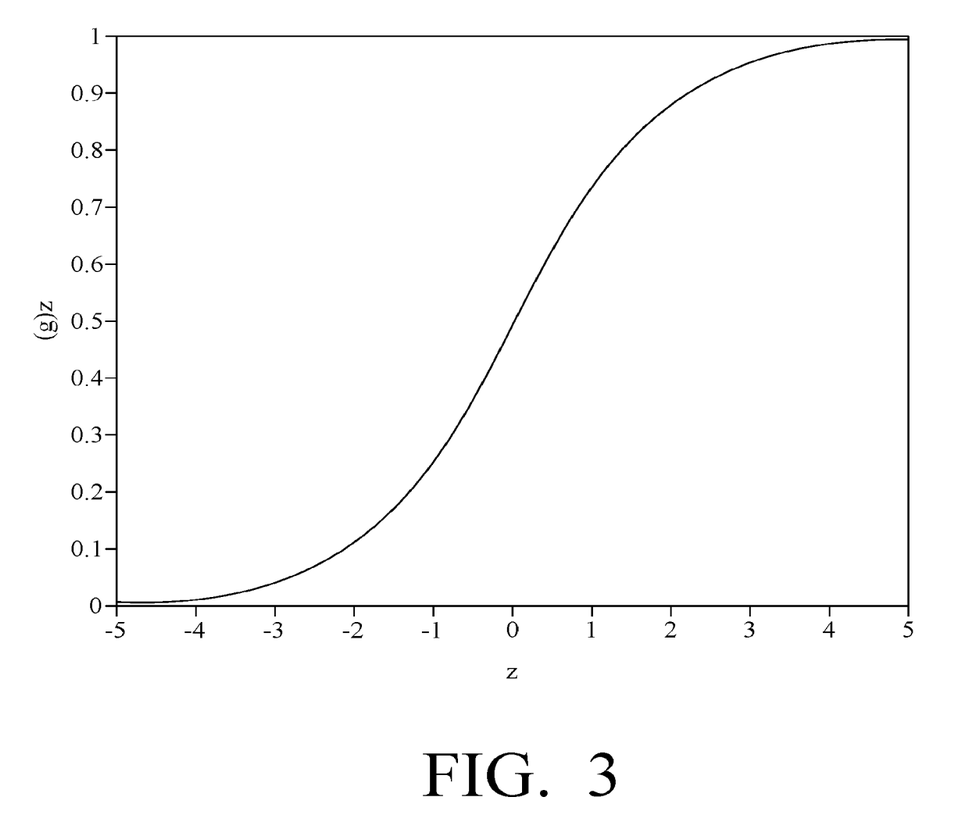
FIG. 3 is a plot of a logistics function.

As shown in FIG. 3, when plotted, equation (3) results in an S-shaped curve, in which g(z) tends toward 1 as z→∞ and tends toward 0 as z→−∞.

Therefore, the objective is to adjust the parameter θ so that when y=1, $z=1\theta^T x$ is high, and when y=0, $z=\theta^T x$ is low:

$$P(y=1|x;\theta) = h_\theta(x) \tag{4}$$

$$P(y=0|x;\theta) = 1 - h_\theta(x) \tag{5}$$

Or, more concisely:

$$P(y|x;\theta) = (h_\theta(x))^y (1 - h_\theta(x))^{1-y} \tag{6}$$

Furthermore, the logistic regression model can be expanded to provide probabilities in the case of more than two classes. In this particular case, y is not binary and can assume more than two states. The logistic regression model is simply run for each possible state or class.

Again, in this particular case, the objective is to distinguish between four different classes of wastewater: (i) produced water; (ii) flow-back water; (iii) pit water; and (iv) basic sediment and waste (BSW). The logistic regression model is thus applied to predict whether a sample is produced water, or not; whether it is flow-back water, or not; and so on. The results are then aggregated.

For example, the output from the application of one model on a small data set is presented in Table A below:

TABLE A

| Sample No. | True Fluid Type | Pre-dicted BSW | Pre-dicted Flow-back | Pre-dicted Pit Water | Pre-dicted Salt-water | Correct? |
|---|---|---|---|---|---|---|
| 1 | Pit Water | 29% | 0% | 12% | 60% | No |
| 2 | BSW | 6% | 0% | 43% | 51% | No |
| 3 | Pit Water | 0% | 0% | 98% | 2% | Yes |
| 4 | Pit Water | 0% | 0% | 98% | 2% | Yes |
| 5 | BSW | 75% | 0% | 0% | 25% | Yes |
| 6 | Flowback | 0% | 100% | 0% | 0% | Yes |
| 7 | BSW | 56% | 0% | 9% | 36% | Yes |
| 8 | BSW | 62% | 0% | 31% | 7% | Yes |
| 9 | Pit Water | 0% | 0% | 98% | 2% | Yes |
| 10 | Pit Water | 30% | 0% | 63% | 7% | Yes |
| 11 | Flowback | 0% | 50% | 50% | 0% | No |
| 12 | Pit Water | 0% | 50% | 50% | 0% | No |
| 13 | Saltwater | 39% | 0% | 21% | 40% | Yes |
| 14 | Saltwater | 13% | 0% | 0% | 87% | Yes |
| 15 | Saltwater | 6% | 0% | 0% | 94% | Yes |
| 16 | Saltwater | 43% | 0% | 3% | 54% | Yes |
| 17 | Saltwater | 21% | 0% | 14% | 64% | Yes |
| 18 | Saltwater | 19% | 0% | 10% | 70% | Yes |

Each row in Table A denotes one sample of wastewater. The column labeled "True Fluid Type" is the actual classification of that sample as given by the operator. Each of the next four columns is a probability that the sample is in the identified one of the four classes. For example, Sample No. 3 was pit water. Based on the pH, conductivity, and total suspended solids content of that sample, the model predicted that it had a 98% chance of being pit water, Thus, if a future sample had the same properties as Sample No. 3, the model would predict that the sample was pit water with 98% certainty.

Again, the water classification model is built and established by using the water information from an external source (or "truth data") and then correlating that water information to the collected (and cleaned) data from the second sensor 30. Once initially established, the model may be applied once to the test set of water information in order to assess its accuracy. The water classification model is then stored in a memory component that is part of or associated with the water classification module 40.

Referring again to FIG. 2, as mentioned above, once built and established, the water classification model is applied to subsequently collected (and cleaned) data to determine a classification for the wastewater, as indicated by block 220.

Finally, the classification, along with statistics for the disposed wastewater during the wastewater disposal event, is communicated to an operator or other interested parties, as indicated by block 230. It is contemplated and preferred that such communication to the operator or other interested parties could be achieved through electronic mail delivery and/or through export of the data to an access-controlled Internet web site, which the operator or other interested parties can access through a common Internet browser program. For example, an operator of the well facility 10 may be provided with a wastewater classification for a volume of wastewater. The operator may then verify with a driver and/or customer who dumped the wastewater to determine that all records are accurate, that the customer was charged for the correct type of wastewater disposal, and/or to otherwise ensure that the customer is representing the contents of the wastewater truthfully. The information may also be delivered to a back-end accounting system that allows the operator to, for instance, automatically send invoices, pay expenses, and comply with state, regional, and/or federal recordkeeping requirements.

In addition to being used internally by the operator of a disposal well, information derived from the system may be automatically communicated to interested water marketplace participants. For instance, the disposal well operator may choose to communicate information about current well status, current prices for various types of wastewater, current pump utilization rates, current disposal capacity, current traffic volumes, current well pressures, current tank levels, and the like.

In addition to being utilized by an operator of a well facility 10, the system and method of the present invention may be further leveraged to predict and analyze energy commodity and/or water consumption in a region. For example, the classification and other statistics for the disposed wastewater during the wastewater disposal event may be provided to an aggregate system that collects wastewater classifications from multiple wells and/or from multiple facilities. By identifying the amounts and types of wastewater that is being disposed of in a region, the aggregate system may infer and/or predict water needs for the region. For another example, the aggregate system may be able to infer hydrocarbon extraction site characterizations, such as age of wells or mines, by possessing knowledge of the composition of wastewater in a region. For yet another example, the aggregate system may infer information related to volume of hydrocarbon extraction in a region based on the accurate sensor information from a plurality of wastewater wells in a region. For still yet another example, the aggregate system may be able to forecast hydrocarbon production by possessing knowledge of water-to-oil or water-to-gas ratios in a region, as described in U.S. Patent Publication No. 2016/0063402 entitled "Oilfield Water Management," which is incorporated herein by reference.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for monitoring disposal of wastewater in a disposal well, comprising:
   a computer configured to execute computer-readable instructions;
   at least one event monitor sensor in communication with the computer configured to identify a wastewater disposal event by identifying an entry into a wastewater facility by a disposal truck;

wherein the computer is configured to:

receive, from at least a second sensor, a measurement of wastewater data about one or more characteristics of the wastewater disposed during the wastewater disposal event, the one or more characteristics including at least a volume of wastewater disposed;

analyze the wastewater data by establishing a water classification model based on a comparison between prior wastewater data collected from the second sensor during prior wastewater disposal events and truth data about the wastewater during the prior wastewater disposal events acquired from an external source; and apply the water classification model to the wastewater data from the second sensor to determine a classification of the wastewater characterizing the wastewater disposal event; and report the wastewater disposal event to a central processing facility.

2. The system as recited in claim 1, wherein the at least one event monitor sensor includes at least one of an imaging device, a camera, a laser beam and photo-eye combination, a coil of wire embedded in a road, a pneumatic tube, and a vibration sensor.

3. The system as recited in claim 1, wherein the at least one event monitor sensor includes a current sensor.

4. The system as recited in claim 3, wherein the current sensor monitors power consumption of one or more pumps that are associated with the disposal well.

5. The system as recited in claim 1, wherein the system comprises the second sensor and the second sensor is configured to measure the wastewater data about the one or more characteristics of the wastewater, wherein the second sensor includes at least one of: a total suspended solids (TSS) sensor; a pH sensor; and a conductivity sensor.

6. The system as recited in claim 5, wherein the computer is further configured to determine the classification of the wastewater from the wastewater data by applying the water classification model to map the wastewater data to the classification, wherein the classification includes at least one of: produced water; flow-back water; pit water; or sediment waste.

7. The system as recited in claim 1, wherein the second sensor comprises: a total suspended solids (TSS) sensor; a pH sensor; and a conductivity sensor.

8. A method for monitoring disposal of wastewater in a disposal well, comprising:

identifying, by at least one event monitor sensor, a wastewater disposal event at the disposal well by identifying an entry into a wastewater facility by a disposal truck;

measuring, with at least a second sensor, wastewater data indicative of one or more characteristics of the wastewater, the one or more characteristics including at least a volume of wastewater disposed;

receiving, by a computer configured to execute computer-readable instructions the wastewater data;

analyzing, by the computer, the wastewater data by establishing a water classification model based on a comparison between prior wastewater data collected from the second sensor during prior wastewater disposal events and truth data about the wastewater during the prior wastewater disposal events acquired from an external source;

applying the water classification model to the wastewater data from the second sensor to determine a classification of the wastewater characterizing the wastewater disposal event; and reporting, by the computer to a central processing facility, the wastewater disposal event.

9. The method as recited in claim 8, further comprising positioning the at least one event monitor sensor.

10. The method as recited in claim 8, wherein the at least one event monitor sensor includes at least one of an imaging device, a camera, a laser beam and photo-eye combination, a coil of wire embedded in a road, a pneumatic tube, and a vibration sensor.

11. The method as recited in claim 8, wherein the at least one event monitor sensor is a current sensor.

12. The method as recited in claim 11, wherein the current sensor monitors power consumption of one or more pumps that are associated with the disposal well.

13. The method as recited in claim 8, wherein the second sensor includes at least one of: a total suspended solids (TSS) sensor; a pH sensor; and a conductivity sensor.

14. The method as recited in claim 13, wherein the computer is further operable to determine the classification of the wastewater from the wastewater data by applying the water classification model to map the wastewater data to the classification, wherein the classification includes at least one of: produced water; flow-back water; pit water; or sediment waste.

15. The method as recited in claim 8, wherein the second sensor includes a total suspended solids (TSS) sensor; a pH sensor; and a conductivity sensor.

16. A method for monitoring disposal of wastewater in a disposal well, comprising:

receiving event data, by a computer, from at least one event monitor sensor configured to identify a wastewater disposal event at the disposal well by identifying an entry into a wastewater facility by a disposal truck;

measuring wastewater data about one or more characteristics of the wastewater with a second sensor;

analyzing, by the computer, the wastewater data by:

establishing a water classification model based on a comparison between prior wastewater data collected from the second sensor during prior wastewater disposal events and truth data about the wastewater during the prior wastewater disposal events acquired from an external source;

applying the water classification model to the wastewater data from the second sensor to determine a classification of the wastewater;

receiving, by the computer, wastewater data about one or more characteristics of the wastewater disposed during the wastewater disposal event, the one or more characteristics including at least a volume of wastewater; and reporting, by the computer, the wastewater disposal event.

17. The method as recited in claim 16, further comprising computing statistics for the wastewater based on the wastewater data about the one or more characteristics of the wastewater disposed during the wastewater disposal event.

18. The method as recited in claim 16, wherein the water classification model is based on a logistic regression model.

19. A system for monitoring disposal of wastewater in a disposal well, comprising:

a computer configured to execute computer-readable instructions;

at least one event monitor sensor including a current sensor in communication with the computer configured to identify a wastewater disposal event by monitoring power consumption of a pump associated with a wastewater facility;

wherein the computer is configured to:
receive, from at least a second sensor, a measurement of wastewater data about one or more characteristics of the wastewater disposed during the wastewater disposal event, the one or more characteristics including at least a volume of wastewater disposed;

analyze the wastewater data by establishing a water classification model based on a comparison between prior wastewater data collected from the second sensor during prior wastewater disposal events and truth data about the wastewater during the prior wastewater disposal events acquired from an external source; and apply the water classification model to the wastewater data from the second sensor to determine a classification of the wastewater characterizing the wastewater disposal event; and report the wastewater disposal event to a central processing facility.

20. The system of claim 19, further comprising a water analysis module operable to determine the classification of the wastewater from the wastewater data by applying the water classification model to map the wastewater data to the classification, wherein the classification includes at least one of: produced water; flow-back water; pit water; or sediment waste.

* * * * *